(12) United States Patent
Frodyma et al.

(10) Patent No.: US 7,512,037 B2
(45) Date of Patent: Mar. 31, 2009

(54) METHOD AND APPARATUS FOR ACOUSTIC SYSTEM HAVING A TRANSCEIVER MODULE

(75) Inventors: Frederick J. Frodyma, Tiverton, RI (US); Karl G. Daxland, Westport, MA (US); John R. Guarino, Rehoboth, MA (US); Namir W. Habboosh, Dartmouth, MA (US); William F. Horan, Middletown, RI (US); Raymond A. Janssen, Portsmouth, RI (US); Leonard V. Livernois, Exeter, RI (US); David A. Sharp, Middletown, RI (US)

(73) Assignee: Raytheon Company, Waltham, MA (US)

( * ) Notice: Subject to any disclaimer, the term of this patent is extended or adjusted under 35 U.S.C. 154(b) by 223 days.

(21) Appl. No.: 11/383,060

(22) Filed: May 12, 2006

(65) Prior Publication Data

US 2007/0070814 A1 Mar. 29, 2007

Related U.S. Application Data

(60) Provisional application No. 60/720,515, filed on Sep. 26, 2005.

(51) Int. Cl.
*G01S 7/00* (2006.01)
*G01S 15/02* (2006.01)
(52) U.S. Cl. ............................ 367/134; 367/903
(58) Field of Classification Search ................ 367/96, 367/134, 903, 13
See application file for complete search history.

(56) References Cited

U.S. PATENT DOCUMENTS

| 3,646,554 | A | * | 2/1972 | Fierston et al. ............. 342/195 |
| 4,862,427 | A | | 8/1989 | Almagor et al. |
| 5,557,584 | A | | 9/1996 | Suchman |
| 5,881,376 | A | * | 3/1999 | Lundberg et al. ........ 455/226.1 |
| 6,667,934 | B1 | | 12/2003 | Healey |
| 2007/0070814 | A1 | * | 3/2007 | Frodyma et al. ............. 367/134 |

FOREIGN PATENT DOCUMENTS

WO    WO 00/30540    6/2000

OTHER PUBLICATIONS

Prasad, et al., "Deployable Sonar Systems for Underwater Communications", Proceedings of the International Conference on Sonar-Sensors & Systems (ICONS-2002), vol. 2, pp. 119-126.*
Habboosh et al.; "A shallow water inline multiplexed sensor system used for inwater tracking;" Electronic Engineering in Oceanography, Jul. 19-21, 1994; Conference Publication No. 394; Sixth Int'l Conference on Cambridge, UK, London, UK IEEE 1994; XP006512769; ISNB 0-85296-619-9; pp. 106-110.

(Continued)

*Primary Examiner*—Dan Pihulic
(74) *Attorney, Agent, or Firm*—Daly, Crowley, Mofford & Durkee, LLP

(57) ABSTRACT

An acoustic method and apparatus for an acoustic system use a transceiver module, which can transmit to a transmit acoustic element of a transmit sonar array and receive from a receive acoustic element of a receive sonar array in accordance with a common transmit/receive control signal.

43 Claims, 4 Drawing Sheets

OTHER PUBLICATIONS

Hines et al.: "A Free-Floating, Steerable, HF Sona for Environmental Measurements;" Oceans '93, Engineering in Harmony With Ocean; Proceedings Victoria, BC, Canada; Oct. 18-21, 1993; XP010117421; ISBN 0-7803-1385-2; pp. II-65-II-70.

Hines et al; "A wide-band sonar for underwater acoustics measurements in shallow water;" Oceans '98 Conference Proceedings Nice, France; Sep. 28-Oct. 1, 1998; IEEE US vol. 3; Sep. 28, 1998; ISBM 0-7803-5045-6; pp. 1558-1562.

Partial PCT Search Report of the EP for PCT/US2006/028593 dated Jan. 9, 2007.

PCT Search Report and Written Opinion of the ISA for PCT/US2006/028593 dated Mar. 12, 2007.

* cited by examiner

METHOD AND APPARATUS FOR ACOUSTIC SYSTEM HAVING A TRANSCEIVER MODULE

CROSS REFERENCE TO RELATED APPLICATIONS

This application claims the benefit under 35 U.S.C. §119 (e) of U.S. Provisional Application No. 60/720,515, filed Sep. 26, 2005, which application is incorporated herein by reference in its entirety.

STATEMENT REGARDING FEDERALLY SPONSORED RESEARCH

FIELD OF THE INVENTION

This invention relates generally to acoustic systems, methods, and related equipment and, more particularly, to a sonar system having a transceiver module adapted to both transmit to and receive from an acoustic element of a sonar array in accordance with a common transmit/receive control signal.

BACKGROUND OF THE INVENTION

Sonar systems that transmit and receive sound with a sonar array are well known in the art. The sonar array can include one or more acoustic elements arranged in a pre-selected pattern, for example, a cylinder, a plane, a sphere, and/or a line.

The sonar system has both transmit functions and receive functions. The transmit functions include, but are not limited to, transmit beamforming. The receive functions include, but are not limited to, receive beamforming, target detection, target localization, target tracking, target display, and fire control solution processing, which can direct a weapon toward the target based upon the target localization and tracking.

With sonar arrays arranged as described above, transmit and receive beamforming techniques are known, which can form transmit beams associated with transmitted sound, and which can also form receive beams associated with received sound. In general, the transmit and the receive beams need not be identically shaped. Also, the transmit and the receive beams need not have the same shapes at different transmit and receive sound frequencies, even with the same sonar array.

It is known that transmit and receive beams, formed with a line array of acoustic elements, are symmetrical about the axis of the line array, and therefore, the beamforming can generate beams constrained in only one dimension (e.g., toroidal shaped beams). It is also known that transmit and receive beams formed with a planar arrangement of acoustic elements (e.g., a ring arrangement), or with a three dimensional arrangement of acoustic elements (e.g., a cylindrical arrangement), are shaped in two dimensions (e.g., a spotlight shaped beam).

Known beamforming techniques include time delay beamforming and phase shift beamforming. With time delay beamforming, for the transmit beamforming function, relative time delays are applied to transmit signals, which are sent to selected acoustic elements of the sonar array used for transmitting sound. For the receive beamforming function, relative time delays are applied to receive signals, which signals are generated by selected acoustic elements of the sonar array used for receiving sound, which are then added together. The relative time delays used in the transmit and receive functions need not be the same. Also, the acoustic elements selected to transmit sound need not be the same acoustic elements selected to receive sound. Also, the sonar array selected to transmit sound need not be in the same sonar array as the sonar array selected to receive sound.

The relative time delays control the steering of the transmit or receive beams. Therefore, by selecting the relative time delays, the transmit or receive beams, for example, the above-mentioned spotlight shaped beam, can be steered in two dimensions while generally maintaining its spotlight shape.

The transmit functions of a sonar system are characterized by a variety of performance characteristics, including but not limited to, a level of sound generated outside of a desired transmit beam (i.e., a transmit beam pattern sidelobe level), an accuracy with which the transmit beam can be pointed in a desired direction, and a desired output power of the transmit beam. The receive functions of a sonar system are also characterized by a variety of performance characteristics, including but not limited to, a receive noise floor, a level of sound received outside of a desired receive beam (i.e., a receive beam pattern sidelobe level), an accuracy with which the receive beam can be pointed in a desired direction, a target detection capability, a target localization accuracy, and a target tracking accuracy.

Conventional shipboard sonar systems used by the military generally include a plurality of racks of equipment, a group of which provides the above-described transmit functions (including transmit beamforming) and another group of which provide the above-described receive functions (including receive beamforming). In conventional sonar systems, the transmit and receive functions have been kept physically separated for a variety of reasons. One reason for separation of the transmit and receive functions is a perception that the transmit functions might generate crosstalk into the receive functions, resulting in degraded performance of the receive functions (i.e., a degraded receive noise floor). Another reason is power, wherein some of the transmit functions require more power than the receive functions, and therefore, power distribution is perceived to be easier if the transmit and receive functions are physically separated. Also, the control structure and control signals of conventional sonar systems are different for transmit and receive functions, resulting in a tendency to separate the transmit and receive functions. Furthermore, engineering disciplines and associated people who design electronic circuits for the transmit function and for the receive function of a conventional sonar system tend to be different.

The above-described physical separation of the transmit and receive functions of a conventional sonar system results in a large number of cables and cabinets. Notably, separate control cables are used for the transmit functions and for the receive functions.

SUMMARY OF THE INVENTION

In accordance with one aspect of the present invention, a sonar system includes a transceiver module adapted to transmit to a transmit acoustic element of a transmit sonar array and adapted to receive from a receive acoustic element of a receive sonar array in accordance with a common transmit/receive control signal including a transmit control signal and a receive control signal. The sonar system also includes a telemetry interface coupled to the transceiver module, and a telemetry medium having a first end coupled to the telemetry interface and having a second end adapted to receive the common transmit/receive control signal.

In accordance with another aspect of the present invention, a sonar transceiver module includes a transmitter adapted to couple to a transmit acoustic element of a transmit sonar array and a receiver adapted to couple to a receive acoustic element of a receive sonar array. The sonar transceiver module also includes an input/output processor coupled to the transmitter and to the receiver, wherein the input/output processor is adapted to receive a common transmit/receive control signal including a transmit control signal and a receive control signal. The transmitter is further adapted to receive the transmit control signal in accordance with the common transmit/receive control signal. The receiver is further adapted to receive the receive control signal in accordance with the common transmit/receive control signal. The receiver is further adapted to transmit time samples of an acoustic signal received by the acoustic element via the input/output processor.

In accordance with yet another aspect of the present invention, a method of transmitting and receiving in a sonar system includes receiving a common transmit/receive control signal including a transmit control signal and a receive control signal, generating a transmit waveform in accordance with the common transmit/receive control signal, transmitting the transmit waveform to a transmit acoustic element of a transmit sonar array, and receiving a receive waveform from a receive acoustic element of a receive sonar array in accordance with the common transmit/receive control signal. The method also includes converting the receive waveform to a digital receive signal, and transmitting the digital receive signal.

In some embodiments of the above aspects of the present invention, the transmit and receive sonar arrays are the same sonar array. In some embodiments of the above aspects of the present invention, the transmit and receive acoustic elements are the same acoustic element.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
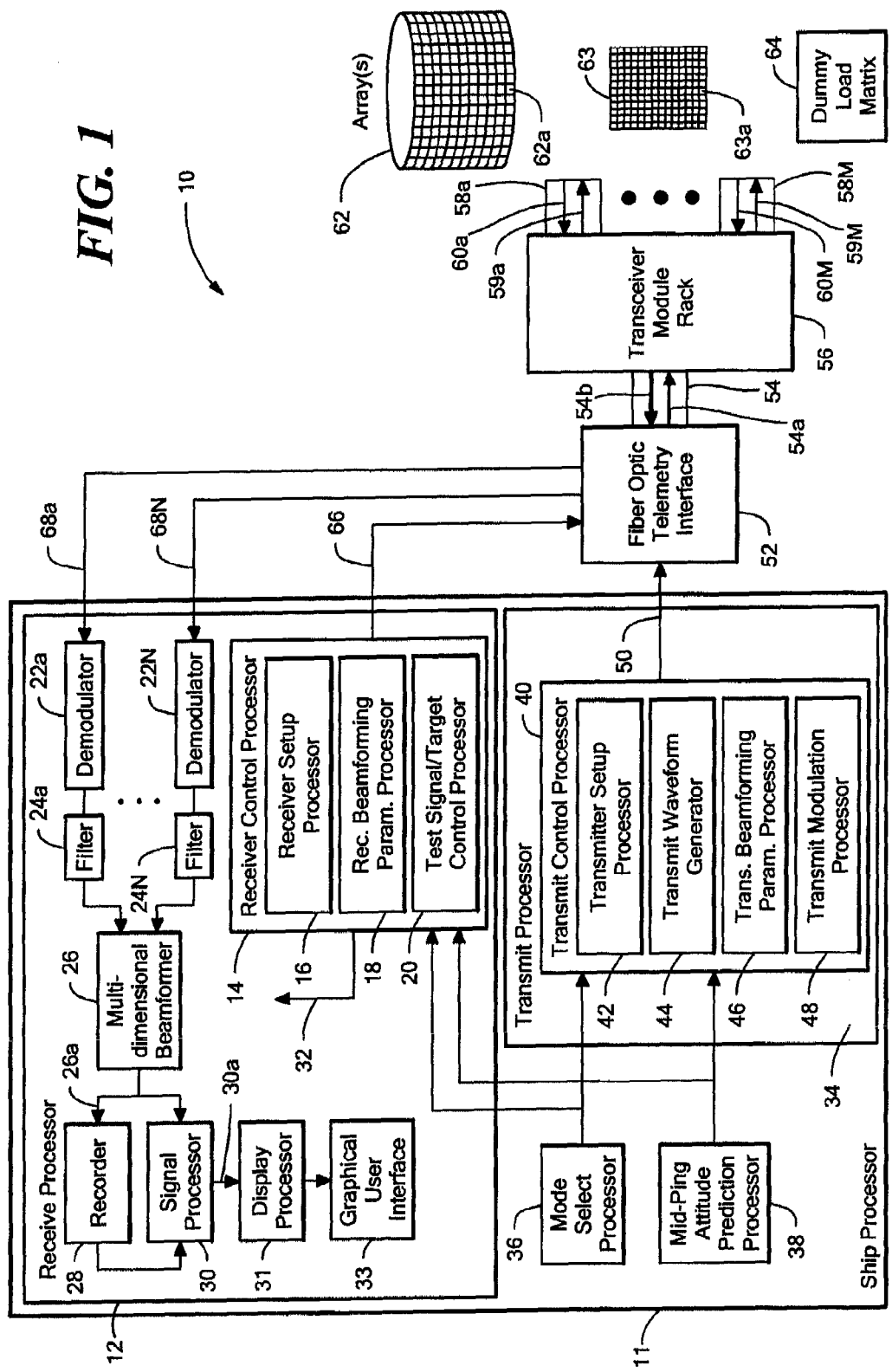
FIG. 1 is a block diagram of a sonar system in accordance with the present invention having a transceiver module rack.

Before describing the present invention, some introductory concepts and terminology are explained. As used herein, the term "telemetry medium" is used to describe a medium through which information can be communicated. For example, a communication medium can be a wire, an optical fiber, a plurality of wires, a plurality of optical fibers, and/or free space. In particular, as used herein, the term "fiber optic telemetry medium " is used to describe one or more optical fibers, which may or may not be combined into one fiber optic cable but which comprise one communication interface. Also in particular, as used herein, the term "wireless telemetry medium " is used to describe free space, which can include a gas, for example air, or which can include no gas, for example, outer space.

As used herein, the term "telemetry interface " is used to describe an electronic circuit adapted to communicate information through a telemetry medium. In particular, as used herein, the term "fiber optic telemetry interface " is used to describe an electronic circuit adapted to communicate information through a fiber optic telemetry medium. Also in particular, as used herein, the term "wireless telemetry interface " is used to describe an electronic circuit adapted to communicate information through a wireless telemetry medium.

As used herein, the term "acoustic element" is used to describe a portion of a sonar array, which is generally representative of a point acoustic transmitter or receiver. It will be understood, however, that an acoustic element can have a physical extent and also need not be symmetrical. An acoustic element can include, but is not limited to a piezoelectric element, for example, a piezoelectric ceramic element or a piezoelectric polymer element, a magnetorestrictive element, or any physical element that can be used to generate and/or receive sound.

As used herein, the term "transmit signal" is used to generally describe an analog transmit waveform, and also a digital time sampled signal representative of the analog transmit waveform, which is ultimately transmitted as a transmitted sound signal by an acoustic element into the water or other acoustic medium. Therefore, the transmit signal can be a digital representation, for example, a time series of electrical digital values, an electrical analog waveform, or a corresponding transmitted sound signal.

Similarly, as used herein, the term "receive signal" is used generally to describe an analog receive waveform, and also a digital time sampled signal representative of the analog receive waveform, which is initially received as a receive sound signal from the water or other acoustic medium. Therefore, the receive signal can be a digital representation, for example, a time series of electrical digital values, an electrical analog waveform, or a corresponding received sound signal.

As used herein, the term "ping" is used to refer to a form of transmit or receive signal. A ping can include, but in not limited to, a continuous wave (CW) signal having a non-infinite time duration, a frequency modulated (FM) signal, a chirp signal that sweeps in frequency between a starting frequency and an ending frequency, an amplitude modulated (AM) signal, a frequency shift keyed (FSK) signal (or frequency hopped sound signal), and a random signal.

A variety of beamforming techniques are known, wherein an acoustic transmit beam or an acoustic receive beam can be formed and/or steered using a plurality of acoustic elements in a sonar array. For time delay beamforming, a beam steering angle is determined by relative time delays applied to signals sent to or received from the acoustic elements of the sonar array. In general, a beam width is determined primarily by a number and physical extent of the acoustic elements, and also by a relative amplitude scaling applied to the signals sent to or received from the acoustic elements of the sonar array. It will also be appreciated that sidelobe levels of a transmit or receive beam generated by a sonar array can be influenced by the relative amplitude scaling of signals sent to or received from acoustic elements of the sonar array. Conventional amplitude scalings (also referred to as shadings or weightings) include Uniform, Hamming, Hanning, and Chebyschev amplitude scalings, each having particular beamwidth and sidelobe characteristics.

While the below contemplated system, apparatus, and method are described in conjunction with a ship sonar system, it will be appreciated that the system, apparatus, and method of the present invention are not limited to a ship sonar system, but apply also to any sonar system and further to any acoustic system, including an air acoustic system.

Referring to FIG. 1, an exemplary sonar system 10, includes a ship processor 11 having a receive processor 12, a transmit processor 34, a mode select processor 36, and a mid-ping attitude prediction processor 38. The transmit processor 34 can include a transmit control processor 40 adapted to control transmit functions of the sonar system 10. The transmit control processor 40 can include a transmitter setup processor 42, a transmit waveform generator 44, a transmit beamforming parameter processor 46, and a transmit modulation processor 48.

Functions of the transmit control processor 40 are described more fully below. However, let it suffice here to say that the transmit control processor 40 is adapted to receive information from the mode select processor 36 and from the mid-ping attitude correction processor 38 and to communicate a transmit control signal 50. The transmit control signal 50 includes a combination of the outputs from the transmit setup processor 42, the transmit waveform generator 44, the transmit beamforming processor 46, and the transmit modulation processor 48. The transmit control signal 50 can include information sufficient to allow the sonar system 10 to transmit sound having desired characteristics into the water as will become apparent from discussion below.

Figure 3:
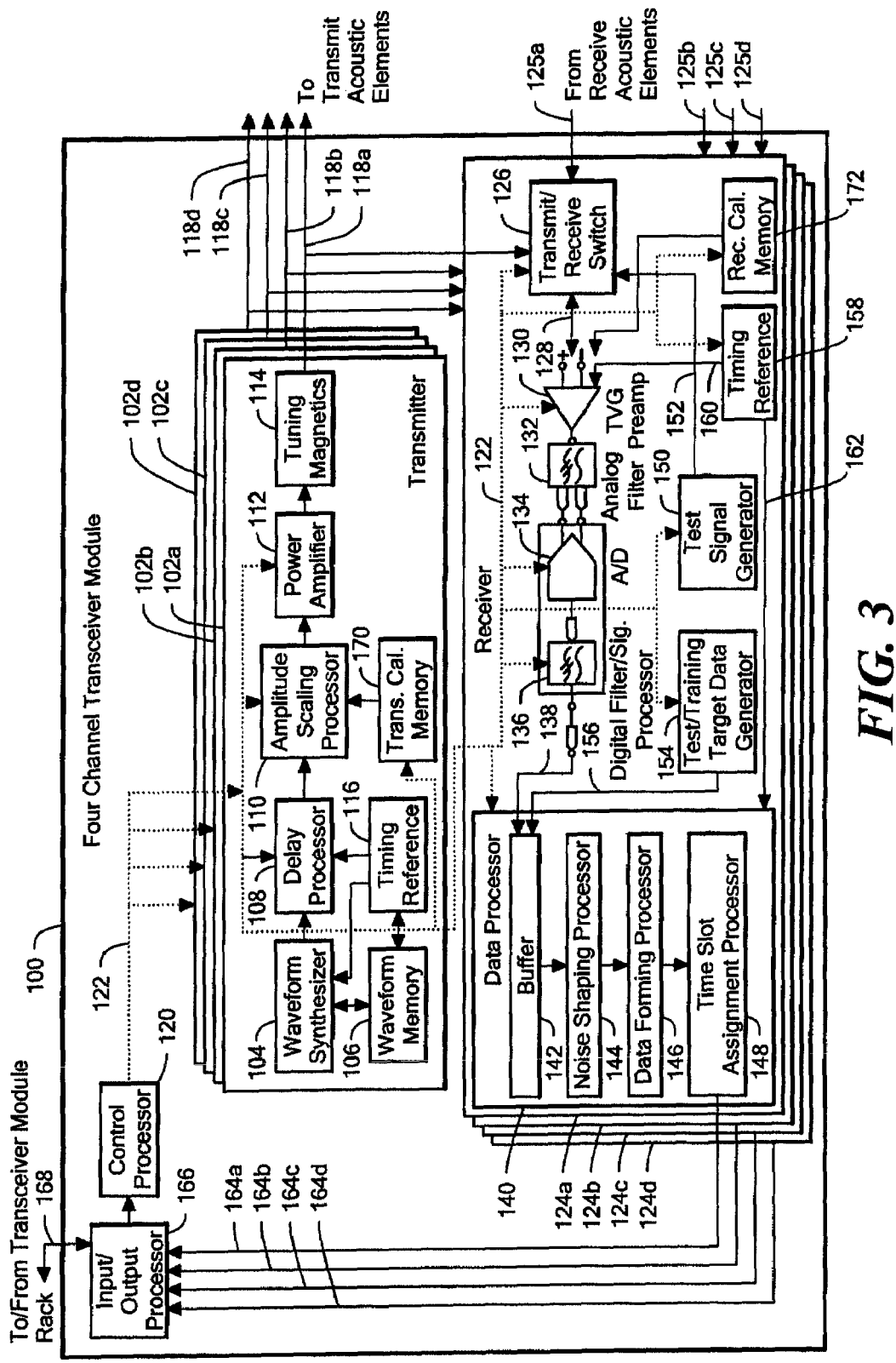
FIG. 3 is a block diagram showing further details of a transceiver module shown in FIG. 2.

The sonar system 10, can also include a fiber optic telemetry interface 52, adapted to receive the above-described transmit control 50 and transmit the transmit control signal 50 within a so-called "common transmit/receive control signal" 54a via a fiber optic telemetry medium 54 (e.g., a fiber optic cable) for transmission to a transceiver module rack 56 having one or more transceiver modules (not shown, see, e.g., FIG. 3). The common transmit/receive control signal 54a is described more fully below.

The transceiver module rack 56 provides transmit signals 59a-59M via cables 58a-58M to one or more sonar arrays 62, 63 each having one or more acoustic elements, e.g., acoustic elements 62a, 63a. In some arrangements, each one of the transmit signals 59a-59M is coupled to but one respective acoustic element. However, in other arrangements, one or more of the cables is coupled to more than one respective acoustic element. In still further arrangements, more than one of the cables 58a-58M is coupled to one of the acoustic elements, providing a parallel arrangement. In still other arrangements, a switching matrix (not shown) can direct couplings from the cables 58a-58M to selectable ones of the acoustic elements.

While the cables 58a-58M are shown to include both respective transmit signals 59a-59M and respective receive signals 60a-60M, in other embodiments, the transmit signals 59a-59M and the receive signals 60a-60M are communicated on separate cables.

In some embodiments, one or more of the transmit signals 59a-59M can also be selectively coupled to a dummy load matrix 64. The dummy load matrix 64 can include electronic elements representative of one or more acoustic elements, but which do not transmit sound. The dummy load matrix can be coupled to the transceiver module rack in place of one of the sonar arrays 62, 63 in order to test the sonar system 10.

The receive processor 12 can include a receive control processor 14 adapted to control receive functions of the sonar system 10. The receive control processor 14 can include a receiver setup processor 16, a receive beamforming parameter processor 18, and a test signal/target control processor 20. Functions of the receive control processor 14 are described more fully below. However, let it suffice here to say that the receive control processor 14 is adapted to generate a first receive control signal 32, which is communicated to other portions of the receive processor 12, and to generate a second receive control signal 66, which is communicated to the fiber optic telemetry interface 52. The first and second receive control signals 32, 66 include a combination of the outputs from the receiver setup processor 16, the receive beamforming processor 18, and the test signal/target control processor 20. The first and second receive control signals 32, 66 can include data sufficient to allow the sonar system 10 to receive and process sound from the sonar array (e.g. 62, 63) as will become apparent from discussion below.

The receive processor 12 can process receive signals associated with the acoustic elements of the sonar array (e.g., 62, 63). To this end, receive signals 60a-60M are communicated from the sonar array (e.g., 62, 63) via the cables 58a-58M to the transceiver module rack 56. The receive signals 60a-60M are communicated as receive signals 54b via the fiber optic telemetry medium 54 to the fiber optic telemetry interface 52. Some or all of the receive signals 60a-60M are communicated as receive signals 68a-68N to the receive processor 12. The number of receive signals 68a-68N can be the same as or different from the number of receive signals 60a-60M.

The receive processor 12 can include demodulators 22a-22N and filters 24a-24N, which can provide demodulated receive signals associated with receive signals 68a-68N and selected acoustic elements of the sonar arrays (e.g., 62 and/or 63) to a multi-dimensional beamformer 26 (e.g., a three dimensional (3D) beamformer). The multi-dimensional beamformer 26 can provide one or more beamformed receive signals 26a to a recorder 28 and to a signal processor 30. The signal processor 30 can provide a processed signal 30a to a display processor 31, which can operate a graphical user interface 33.

In operation, the transmitter setup processor 42 can generate a variety of setup values, for example, a value that determines whether a transmitter contained in the transceiver module rack 56 operates in class D or class S mode, and a value that determines a transmit acoustic power. Other such transmitter setup values are described below in conjunction with FIG. 3.

The transmit waveform generator 44 can generate a plurality of transmit waveform values associated with a transmit waveform. For example, the transmit waveform values can be digital values corresponding to samples of a transmit waveform. As another example the transmit waveform values can be digital values representative of a lowest frequency, a highest frequency, and a sweep rate associated with a chirp transmit waveform. As yet another example, the transmit waveform values can be digital values representative of a frequency and a duration of a pulse sinusoid transmit waveform. As yet another example, the transmit waveform values can be associated with a broadband transmit waveform, and can be representative of a lowest and highest band frequency.

In one particular embodiment, the output signal from the transmit waveform generator 44 is a time series of digital samples representative of a transmit waveform. In one particular embodiment, the time samples are provided at a 100 kHz rate, and each time sample includes 16 bits. However, the sonar system 10 is not limited to any particular number of bits per sample or any particular sample rate.

The transmit beamforming parameter processor 46 can generate a plurality of transmit beamforming values associated with a transmit beampattern. For example, the transmit beamforming values can include digital values corresponding to one or more of a set of selected acoustic elements in the sonar array to be used for transmitting, relative time delays to be applied to transmit waveforms communicated to the selected transmit acoustic elements, and relative amplitudes (scalings) to be applied to transmit waveforms communicated to the selected acoustic elements.

The transmit modulation processor 48 can generate transmit modulation values associated with a transmitted sound signal. For example, the transmit modulation values can include an amplitude modulation value representative of a frequency and a modulation percentage of an amplitude modulation to be applied to a waveform determined by the transmit waveform generator 44.

It will be understood that some of the above-described values within the transmit control signal 50 generated by the transmit control processor 40 can be influenced by the mode select processor 36 and/or by the mid-ping attitude prediction processor 38. For example, the mode select processor 36, which can be controlled by a user, can determine that the array 62 is used for the transmit functions and the array 63 is used the receive functions of the sonar system 10. The mode select processor 36 can also, for example, determine an azimuth range in which to operate the sonar system 10. To this end, the mode select processor 36 can influence the transmit control processor 40 accordingly, providing, for example, time delay limits to the transmit beamforming parameter processor 46, which tend to limit steering angles of the resulting transmit beams. The mode select processor 36 can also influence which sonar array 62, 63 is used for the transmit function and which acoustic elements are selected in the selected sonar array.

Similarly, the mid-ping attitude prediction processor 38 can influence some of the above-described values within the transmit control signal 50 generated by the transmit control processor 40. For example, where a ship on which the sonar system 10 is mounted is experiencing pitch, roll, and/or heave, a desired transmit (and receive) beam steer angle can be influenced by the pitch, roll, and/or heave. The mid-ping attitude prediction processor 38 can predict the ship attitude at the time of the next ping and can provide information (e.g., adjustment of time delay values) to the transmit control processor 40 (and/or to the receive control processor 14) in order to keep the transmit (and/or receive) beams steered in the proper direction.

The transmit control signal 50 generated by the transmit control processor 40 is communicated to the fiber optic telemetry interface 52. Similarly, the second receive control signal 66 is communicated to the fiber optic telemetry interface 52. The fiber optic telemetry link combines the transmit control signal 50 and the second receive control signal 66 into the "common transmit/receive control signal" 54*a*, which is communicated via the fiber optic telemetry medium 54 to the transceiver module rack 56.

As used herein, the term "common transmit/receive control signal," is used to describe a control signal that can contain aspects for control of both a receive function and a transmit function. To this end, the common transmit/receive control signal 54*a* can include the transmit control signal 50 and the second receive control signal 66. The common transmit/receive control signal 54*a* is communicated via one or more telemetry media. The common transmit/receive control signal 54*a* can be communicated via one telemetry medium having one physical path, for example, a fiber optic cable having one optical fiber or a cable having one primary conductor. However, the common transmit/receive control signal 54*a* can also be communicated via one telemetry medium having a plurality of physical paths, for example a fiber optic cable having a plurality of optical fibers, or a cable having a plurality of conductors. The common transmit/receive control signal 54*a* can be comprised of a serial bit stream, a parallel bit stream, or a serial byte stream. It will be understood that the common transmit/receive control signal 54*a* is comprised of digital data for control of aspects of the transmit and receive functions, digital addresses which direct the digital data to control the particular aspects of the transmit and receive functions, as well as other digital bits and/or words used as data delimiters and the like. The control aspects of the transmit and receive functions can include, but are not limited to, setup aspects and also synchronization aspects of the transmit and receive functions.

The fiber optic telemetry medium 54 provides bi-directional telemetry, wherein the above-described common transmit/receive control signal 54*a* travels from the fiber optic telemetry interface 52 to the transceiver module rack 56, and the receive signals 54*b* travel from the transceiver module rack 56 to the fiber optic telemetry interface 52. However, in other embodiments, the common transmit/receive control signal 54*a* is provided via one telemetry medium and the receive signals 54*b* are provided via another telemetry medium.

In operation, the cables 58*a*-58M can provide links for bi-directional signals. The transmit signals 59*a*-59M are sent from the transceiver module rack 56 to a transmit sonar array (e.g., 62 and/or 63) resulting in sound transmitted into the water, and the receive signals 60*a*-60M are returned from a receive sonar array (e.g., 62 and/or 63) to the transceiver module rack 56. The transmit and receive signals can be communicated on the same ones of the cables 58*a*-58M or on different ones of the cables 58*a*-58M. It will be appreciated that the transmit and receive sonar arrays can be the same sonar array or they can be different sonar arrays. Even if they are the same sonar array, the transmit acoustic elements within the sonar array can be the same as the receive acoustic elements within the sonar array or they can be different from the receive acoustic elements. In some arrangements, at least some of the cables 58*a*-58M are unidirectional, and communicate either transmit signals or receive signals.

In operation, the acoustic elements of the sonar arrays 62, 63 provide the receive signals 60*a*-60M from the receive acoustic elements back through the cables 58*a*-58M to the tranrsceiver module rack 56. It will be appreciated that the receive signals 60*a*-60M can include a variety of signal characteristics, including, for example, respective echoes from a target, reverberation associated with an acoustic transmission from the sonar arrays 62, 63, electrical noise, and acoustic background noise present in the ocean.

The transceiver module rack 56 communicates the receive signals 60*a*-60M as the receive signals 54*b* via the fiber optic telemetry medium 54 to the fiber optic telemetry interface 52. In one particular embodiment, the transceiver module rack 56 provides two hundred eighty eight receive channels, each including samples of a respective receive waveform associated with a respective acoustic element, wherein the samples each have 16 bits and have a sample rate of 100 kHz. However, the sonar system 10 is not limited to any particular number of receive channels, any particular number of bits per sample, or any particular sample rate.

The fiber optic telemetry interface 52 operates to split the receive signals 54*b*, which are communicated on the fiber optic telemetry medium 54 as a serial bit stream, into a plurality of parallel receive signals 68*a*-68N corresponding to the number of acoustic elements used for the receive function. Taking one channel having the receive signal 68*a* as representative of the other channels, the receive signal 68*a* is presented to the demodulator 22*a*. As described above, the transmit waveform can have a variety of modulations, and therefore, the acoustic elements generate receive signals having the same modulation. The demodulator 22*a* can remove the modulation and can provide a demodulated signal to the filter 24*a*. The demodulator 22*a* can also provide other functions, including but not limited to, quadrature demodulation to provide signal amplitude and phase of the receive signal 68*a*, own-ship Doppler effect removal from the receive signal 68*a*, and the demodulator 22*a* can also mix the receive signal 68*a* to an intermediate frequency rather than to baseband. A plurality of demodulated and filtered signals are provided by the filters 24*a*-24N to the multi-dimensional beamformer 26.

The multi-dimensional beamformer 26 provides one or more beamformed signals 26*a* to the signal processor 30 and to the recorder 28. The recorder 28 can store the beamformed signals 26*a* for later retrieval and analysis by the signal processor 30. The signal processor 30 can process the beamformed signals in real time, and provide an output 30*a* indicative of a detection of a target. The output signal 30*a* from the signal processor 30 can be provided to the display processor 31, which can display the target on the graphical user interface 33.

As described above, control of the receive functions of the sonar system 10 is provided by the receive control processor 14. To this end, it will be appreciated that some of the control is provided to the transceiver module rack 56 by the second receive control signal 66, and other control is provided to the receive processor 12 by the first receive control signal 32.

In operation, the receiver setup processor 16 can generate a variety of receiver setup values, for example, a value that determines an electronic gain of a receiver contained in the transceiver module rack 56 and a value that determines filtering applied to the received signals 60*a*-60M. Other receiver setup values are described below in conjunction with FIG. 3. The receiver setup values can be provided in the second receive control signal 66.

The receive beamforming parameter processor 18 can generate a plurality of receive beamforming values associated with a receive beampattern. For example, the receive beamforming values can include digital values corresponding to one or more of a set of selected acoustic elements in the sonar array to use for receiving, relative time delays to be applied to the selected receive acoustic elements, and relative amplitudes (scalings) to be applied to the selected acoustic elements. The receive beamforming values can be provided in the first receive control signal 32.

The test signal/target control processor can generate values associated with a test/training target generator (e.g., 154, FIG. 3) and a test signal generator (e.g., 150, FIG. 3) within the transceiver module rack 56 as described below in conjunction with FIG. 3. These values can be provided in the second receive control signal 66.

The multi-dimensional beamformer 26 can apply the above-described relative time delays and relative amplitude scalings provided by the receive beamforming parameter processor 18 to the demodulated signals provided by the filters 24*a*-24N. In this way, as described above for the transmit beamforming, the sonar system 10 can form and steer receive beams to a desired direction in accordance with receive beamforming parameters used in the receive function.

As described above for the transmit control processor 40, the receive control processor 14 can be influenced by the mode select processor 36 and by the mid-ping attitude correction processor 38 in much the same way.

The acoustic elements used in the receive function can be selected in any orientation in a sonar array. For example, the acoustic element used for the receive function with the planar sonar array 62 can be disposed along a horizontal line, along a vertical line, along a plurality of horizontal lines, along a plurality of vertical lines, or any combination thereof. It should, therefore, be understood that the receive beams can be steered to any angle in space, resulting in a multi-dimensional beamforming.

As described above, the transceiver module rack 56 provides one or more transmit signals 59*a*-59M and receives one or more receive signals 60*a*-60M via a respective one or more cables 58*a*-58M. Each one of the cables 58*a*-58M can couple to an acoustic element of a sonar array. For example, a cable 58*a* can be coupled to an element 62*a* of a cylindrical sonar array 62. However, in other arrangements, some of the cables 58*a*-58M can couple to more than one acoustic element of a sonar array, for either the transmit or the receive function or both.

In some arrangements, the cables 58*a*-58M provide transmit waveforms to acoustic elements in more than one sonar array, for example to the cylindrical sonar array 62 and to a planar sonar array 63. The sonar arrays (e.g., 62, 63) can operate simultaneously or not.

In one particular embodiment, there are two hundred eighty eight cables coupled to two hundred eighty eight acoustic elements in one sonar array. However, in other embodiments, there can be more than or fewer than two hundred eighty eight cables coupled to more than or fewer than two hundred eighty eight acoustic elements.

In some embodiments, all of the cables 58*a*-58M are bi-directional cables used for both the transmit and receive functions. However, in other arrangements, some of the cables 58*a*-58M are used for only the transmit or the receive function and are, therefore, unidirectional.

While the cylindrical array 62 and the planar array 63 are shown, in other arrangements, the transceiver module rack 56 can provide the transmit signals 59*a*-59M to and receive the receive signals 60*a*-60M from more than two sonar arrays or fewer than two sonar arrays. Also, while a sonar system is described above that transmits acoustic energy and receives acoustic energy from a sonar array accordingly, in other arrangements, the sonar system 10 transmits sonar energy with one sonar array, for example with the planar sonar array 63, and receives associated receive sound with another sonar array, fore example, with the cylindrical sonar array 62.

While a cylindrical array 62 and a planar array 63 are shown, in other arrangements, the transceiver module rack can be coupled to other types of sonar arrays, for example a line array, a spherical array, or a conformal array.

While one transceiver module rack 56 is shown, in other arrangements, more than one transceiver module rack is provided. In these arrangements, each one of the transceiver module racks can couple to the fiber optic telemetry medium 54, which can provide the above-described common transmit/receive control signal 54*a* to the transceiver module racks, and which can provide the receive signals 54*b* associated with the acoustic elements of the sonar arrays 62, 63. However, in these arrangements, more than one fiber optic telemetry medium, similar to the fiber optic telemetry medium 54, can also be used to provide signals to and from the different transceiver module racks.

It should be understood that the fiber optic telemetry medium 54 can include one or more than one optical fiber, and the optical fibers can carry different signals and in different directions.

While a fiber optic telemetry medium 54 is shown and described, in other arrangements, the fiber optic telemetry medium 54 is instead another form of telemetry medium, for example, a wire or a wireless telemetry medium and the fiber optic telemetry interface is instead a wire telemetry interface or a wireless telemetry interface accordingly. In one particular embodiment, the fiberoptic telemetry medium 54 is instead a wired cable adapted to support Ethernet Internet protocol (IP) communications and the fiberoptic telemetry interface is an Ethernet IP telemetry interface.

Figure 2:
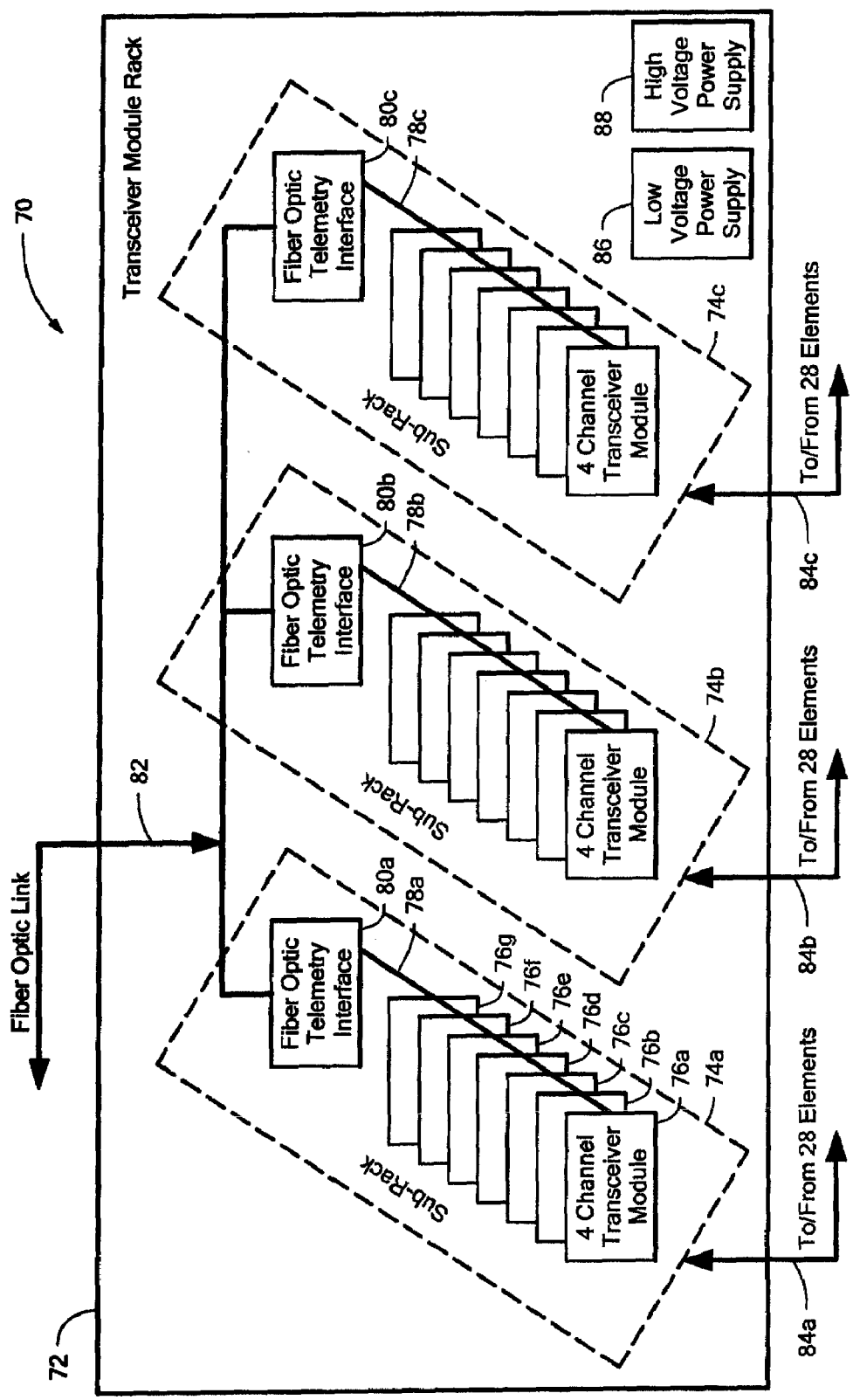
FIG. 2 is a block diagram showing further details of the transceiver module rack of FIG. 1, having a plurality of transceiver module sub-racks, each having a plurality of transceiver modules.

Referring now to FIG. 2, a transceiver module rack 72 can be the same as or similar to the transceiver module rack 56 of FIG. 1. A fiber optic telemetry medium 82 can be the same as or similar to the fiber optic telemetry medium 54 of FIG. 1. Cables 84*a*-84*c* can be the same as or similar to the cables 58*a*-58M of FIG. 1, which are coupled to acoustic elements of a sonar array.

The transceiver module rack 72 can include a plurality of transceiver module sub-racks 74*a*-74*c*. Each one of the sub-racks, for example the sub-rack 74*a*, can include a plurality of four channel transceiver modules 76*a*-76*g*, for example, seven four channel transceiver modules. Each one of the four channel transceiver modules 76*a*-76*g* is adapted to couple to at least four acoustic elements and is adapted to transmit respective transmit signals to those acoustic elements and to receive respective receive signals from those acoustic elements.

The four channel transceiver modules of each transceiver module sub-rack 74*a*-74*c* can communicate on a respective communication link 78*a*-78*c* to a respective fiber optic telemetry interface 80*a*-80*c*, each one of which is coupled to the fiber-optic telemetry medium 82. While the links 84*a*-84*c* are shown as single lines, it will be appreciated that each one of the links 84*a*-84*c* can provide at least twenty eight such links, at least four for each of the seven four channel transceiver modules.

The transceiver module rack 72 can include a low voltage power supply 86 and a high voltage power supply 88. It should be understood that the low voltage power supply 86 can supply low voltage power, for example, through a backplane (not shown), to the four channel modules. Similarly, the high voltage power supply 88 can supply high voltage power, for example, through a backplane (not shown), to the four channel modules. In some embodiments, the high and low voltage backplanes are the same backplane and in other embodiments, they are different backplanes. The low voltage power is generally associated with digital functions and with small signal amplification functions of each of the four channel modules. The high voltage power is generally associated with the final transmitter output stages of each of the four channel modules.

While three transceiver module sub-racks 74*a*-74*c* are shown, in other arrangements, the transceiver module rack 72 can include more than three or fewer than three transceiver module sub-racks. While each one of the transceiver module sub-racks 74*a*-74*c* is shown to include seven four channel transceiver modules, in other arrangements, each one of the transceiver module sub-racks 74*a*-74*c*, or some of the transceiver module sub-racks 74*a*-74*c*, can include more than seven or fewer than seven four channel transceiver modules. Furthermore, in other arrangements, the four channel modules 76*a*-76*g* can include more than four or fewer than four channels as described more fully below.

Referring now to FIG. 3, a four channel transceiver module 100 (or more simply, transceiver module) can be the same as or similar to any one of the four channel transceiver modules of FIG. 2, for example the four channel transceiver module 76*a* of FIG. 2. The transceiver module 100 includes four transmitters 102*a*-102*d* and four receivers 124*a*-124*d*.

Taking the transmitter 102*a* as representative of the other transmitters 102*b*-102*d*, the transmitter 102*a* includes a waveform synthesizer 104, a waveform memory 106, a delay processor 108, an amplitude scaling processor 110, a power amplifier 112, and tuning magnetic elements (or magnetics) 114. The transmitter also includes a timing reference 116 adapted to synchronize a variety of function described more fully below.

The tuning magnetics 114 can be in the form of one or more transformers and/or one or more inductors, and can also include one or more capacitors and/or one or more resistors. In some embodiments, the tuning magnetics are adapted to tune with a resonance, and/or match an impedance, of an acoustic element to which they couple. A cable 118*a* is the same as or similar to one of the cables 58*a*-58M of FIG. 1. As described above in conjunction with FIG. 1, the cable 118*a* can communicate both a transmit signal to a transmit acoustic element and can communicate a receive signal from a receive acoustic element, wherein the transmit acoustic element and the receive acoustic element are the same acoustic element or different acoustic elements. However, in other arrangements described above in conjunction with FIG. 1, the cable 118*a* can communicate only a transmit signal to a transmit acoustic element, and a cable 125*a* can communicate a receive signal from a receive acoustic element that is the same acoustic element or a different acoustic element from the transmit acoustic element, either within the same sonar array or within a different sonar array. In the same way, cables 118*b*-118*c* and cables 125*b*-125*c* can carry signals to other transmit and receive acoustic elements.

Taking the receiver 124*a* as representative of other ones of the receivers 124*b*-124*d*, the receiver 124*a* includes a transmit/receive switch 126 coupled with the link 118*a* to the acoustic transmit element (not shown) of the sonar array. As described above, in some embodiments, the link 118*a* (i.e., cable) can communicate both transmit and receive signals, wherein the receive signals are received by the transmit/receive switch 126 and are passed on to other portions of the receiver 124*a*. In other embodiments, the receive signals are communicated on the link 125*a* and are passed on to the other portions of the receiver 124*a*. The receiver 124*a* also includes a time varying gain (TVG) amplifier 130, an analog filter 132, an analog to digital (A/D) converters 134, and a digital filter/signal processor 136. The receiver 124*a* also includes a timing reference 158 adapted to synchronize a variety of functions described more fully below. In some embodiments, the transmit/receive switch 126 includes a solid-state relay, for example, a solid-state relay having a thyristor. This type of transmit/receive switch 126 can result in about a 15 dB signal to noise improvement over the arrangements of conventional sonar systems. One of ordinary skill in the art will understand the general functions of the transmit/receive switch 126.

The digital filter/signal processor 136 can provide digital filtering of the receive signal. However, in other embodiments, the digital filter/signal processor 136 can include a signal processor capable of performing other functions. For example, in some embodiments, the digital filter/signal processor 136 can provide the demodulation function, provided as described above by the demodulator 22*a* of FIG. 1. Therefore, in other embodiments, the demodulators 22*a*-22N of FIG. 1 can be within the transceiver module 100 instead of within the receive processor 12 of FIG. 1. In other embodiments the digital filter/signal processor 136 can provide further functions, for example, the filtering of filter 24*a* of FIG. 1. In still other arrangements, the digital filter/signal processor 136 can perform a conversion to the frequency domain (e.g., via a Fast Fourier Transform), in which case the above-described receive beamforming performed in the three-dimensional beamformer 26 of FIG. 1 can be done in the frequency domain.

The receiver 124a also includes a data processor 140 having a buffer 142, a noise shaping processor 144, a data formatting processor 146, and a time slot assigmnent processor 148. The transmit/receive switch 126 can be used to disconnect the TVG preamplifier 130 from the cable 118a when a high voltage transmit signal is applied to an acoustic clement on the cable 118a.

The transmit/receive switch 126 can have additional functions, which are available due to proximity of the transmitter 102a to the receiver 124a. For example, in some embodiments, the transmit/receive switch 126 can couple the high voltage transmit signal appearing on the cable 118a to the TVG amplifier 130 (e.g., set to a negative fixed gain) during a transmitter calibration of a sonar system in which the transceiver module 100 is used. In the transmitter calibration, the resulting signal in the receiver 124a is indicative of the voltage on the cable 118a, and the transmit signal can be adjusted accordingly to achieve a desired voltage. To this end, transmit calibration values can be saved in a transmit calibration memory 170 and used to adjust the transmit signal level in the transmitter 102a.

The receiver 124a can also be calibrated during a receiver calibration and receive calibration values can be saved in a receive calibration memory 172. In a receiver calibration, a test signal 152 can be generated by a test signal generator 150, which can be applied to the TVG amplifier (e.g., set to a fixed gain) via the transmit/receive switch 126. A resulting signal in the receiver 124a is indicative of the gain of the receiver 124a.

In both the transmitter calibration and in the receiver calibration, the signals appearing in the receiver 124a can be sent, for example, to the ship processor 11 of FIG. 1 (e.g., signal 54b, FIG. 1), which can process the signals and return calibration values to the transceiver module 100 via the above-described common transmit/receive control signal (e.g., 54a, FIG. 1). However, in other embodiments, in both the transmitter calibration and in the receiver calibration, the signals appearing in the receiver 124a can be measured by the receiver (e.g., by the element 136) and transmit and receive calibration values can be generated by the transceiver module 100.

The transceiver module 100 also includes an input/output processor 166 and a control processor 120.

In operation, the input/output processor 166 receives the common transmit/receive control signal described above in conjunction with FIG. 1 via a communication link 168. Referring briefly again to FIG. 2, the common transmit/receive control signal is communicated to the fiber optic telemetry interfaces 80a-80c via the fiber optic telemetry medium 82 and is communicated to the transceiver modules in the transceiver module rack 72 via the communication links 78a-78c. The link 168 (FIG. 3) can be the same as or similar to one of the communication links 78a-78c.

Referring again to FIG. 3, the input/output processor 166 communicates the common transmit/receive control signal to the control processor 120. The control processor in turn communicates the common transmit/receive control signal 122 to elements of the transmitters 102a-102d and receivers 124a-124d as indicated by dashed lines.

The common transmit/receive control signal 122 can include values to control functions of the transmitters 102a-102d and the receivers 124a-124d. For example, the common transmit/receive control signal can include transmit waveform values described in conjunction with FIG. 1, which can be stored in the waveform memory 106, and which can be directed to the waveform synthesizer 104, in order to generate a transmit waveform.

The common transmit/receive control signal 122 can include transmitter setup values, including the transmit beamforming values, which can influence the delay processor 108 and the amplitude scaling processor 110. The transmit setup values can include power amplifier values, which can operate to select a mode of operation of the power amplifier as well as an output power. The transmit setup values can include transmitter selection values, which can operate to select which of the transmitters 102a-102d to use in the transmit function. The transmit setup values can also include transmit waveform sample rate values, which can influence a sample rate of the waveform synthesizer 104.

The common transmit/receive control signal 122 can include receiver setup values, including receiver gain and time varying gain setup values, which can influence the time TVG preamplifier 130. The receiver control values can also include digital filter values (e.g., tap weights), which can influence the digital filter 136. The receiver control values can also include receiver sample rate values, which can influence a sample rate of the A/D converter 134 and a sample rate of the data formatting processor 146. The receiver control values can also include data formatting values (e.g., number of bits per sample and floating or fixed point data), which can influence the data formatting processor 146. The receiver control values can also include receiver selection values, which can operate to select which of the receivers 124a-124d to use in the receive function, and which can influence the time slot assignment processor 148 accordingly.

Overall, the common transmit/receive control signal 122 can include transmit control values including at least one of: a transmit waveform value (to control the waveform memory 106 and waveform synthesizer 104), a power amplifier mode value (e.g., class D or S mode) (to control the power amplifier 112), transducer transmit linearization values, transmit beamforming values (e.g., relative time delay values, relative amplitude scaling values, relative phase shift values) (to control the delay processor 108 and amplitude scaling processor 110), synchronization values (to control the timing reference 116), transmit filter coefficient values (e.g., for class D power amplifier mode) (to control the power amplifier 112), or transmit waveform modulation values (to control the waveform synthesizer 104). The above-described transducer transmit linearization values can include, for example, values to adjust the output power level of the transmitters 102a-102d according to known non-linearities with respect to frequency and/or with respect to output power level.

Overall, the common transmit/receive control signal 122 can also include receive control values including at least one of: a receive amplifier gain control value (e.g., gain and time varying gain (TVG) rate and slope) (to control the TVG preamp 130), transducer receive linearization values, a receive signal sampling value (e.g., sampling rate, number of bits, output rate) (to control the A/D converter 134, data formatting processor 146, and time slot assignment processor 148), receive digital filter coefficient values (to control the digital filter 136), a receive demodulator value (to control the demodulators 22a-22N, FIG. 1)), receive beamforming values (e.g., relative time delay values, relative amplitude scaling values, relative phase shift values) (to control the beamformer 26, FIG. 1), test tone values and test tone control values (to control a test/training target data generator 154), test target values and test target control values (to control the test signal generator 150), or self diagnostic control values. However, from the discussion above in conjunction with FIG. 1, it will be appreciated that, in some embodiments, the receive demodulator values and the receive beamforming values are provided to and used by only the receive processor 12 (FIG. 1), and therefore, need not be provided in the common transmit/receive control signal 122. The above-described transducer receive linearization values can include, for example, values to adjust the receive signal level of the receiver 124a-124d according to known non-linearities with respect to frequency and/or with respect to receive signal level.

Once set up, the transmitters, e.g., the transmitter 102a, can generate a calibrated, time scaled and properly delayed (and/or phase shifted) transmit waveform, which may have modulation, via the power amplifier 112 and via the tuning magnetics 114 to an acoustic element or elements (e.g., 62a and/or 63a, FIG. 1) of a sonar array. The time scaling and the amplitude scaling, when transmitting in combination with other transmitters 102b-102d or other transmitters on another transceiver modules (not shown), can generate one or more transmit acoustic beampatterns into the water.

Once set up, the receivers, e.g., the receiver 124a, can receive an acoustic signal from the water, amplify, filter, and generate digital time samples of the receive signal and can provide the digital time samples via a communication link 164a to the input/output processor 166. The input/output processor 168 can provide the digital time samples of the receive signal from the receiver 124a to the receive processor 12 (FIG. 1) via the link 168 to a fiber optic telemetry interface (e.g., 80a, FIG. 2), via a fiber optic cable (e.g., 82, FIG. 2) to a fiber optic telemetry interface (e.g., 52, FIG. 1) and to the receive processor (e.g., 12, FIG. 1) via a cable (e.g., 68a, FIG. 1). Similarly, other ones of the receivers 124b-124d, and/or other receivers on other transceiver modules (not shown) provide receive signals associated with other acoustic elements to the receive processor 12. The receive processor 12 can perform the receive beamforming and other receive function processing described above in conjunction with FIG. 1.

In one particular arrangement, the transceiver module 100 is disposed on a common circuit board. However, in other arrangement, the transceiver module 100 is split onto two or more circuit boards, which together form a common assembly.

In one particular embodiment, one or more of the transmitters 102a-102d can have the following characteristics:

a bandwidth spanning about 0.5 Hz to 100 kHz when the associated power amplifier (e.g., 112) is operating as a class D amplifier, and about 90 Hz to 250 KHz when the associated power amplifier is operating as a class S amplifier, a maximum ping duty cycle of at least fifteen percent at full power output and one hundred percent at a power 3 dB below full power, a maximum length of a ping of at least two seconds, and a power output of about 600 Watts minimum at a phase angle of −60 degrees In one particular embodiment, one or more of the receivers 124a-124d can have the following characteristics:

samples of the receive signal having twenty-four bits with a sample rate of at least 324 kHz, an equivalent input electrical noise less than 1.2 nV per root Hertz, and a band level noise floor of less than −135 dBV, a SINAD (signal to noise plus distortion ratio) greater than 110 dB, an instantaneous dynamic range of at least 120 dB and a total dynamic range of at least 140 dB, a frequency response that is flat to +/−0.02 dB from 1 Hz to 100 kHz, a gain tracking between the receivers 124a-124d less than or equal to 0.5 dB, a phase tracking between the receivers 124a-124d less than ten degrees, and crosstalk between the receivers 124a-124d and between the transmitters 102a-102d and any of the receivers 124a-124d less than or equal to −110 dB.

While the transceiver module 100 is shown having the four transmitters 102a-102d and the four receivers 124a-124d, in other arrangements, a transceiver module can have more than four or fewer than four transmitters and more than four or fewer than four receivers.

Figure 4:
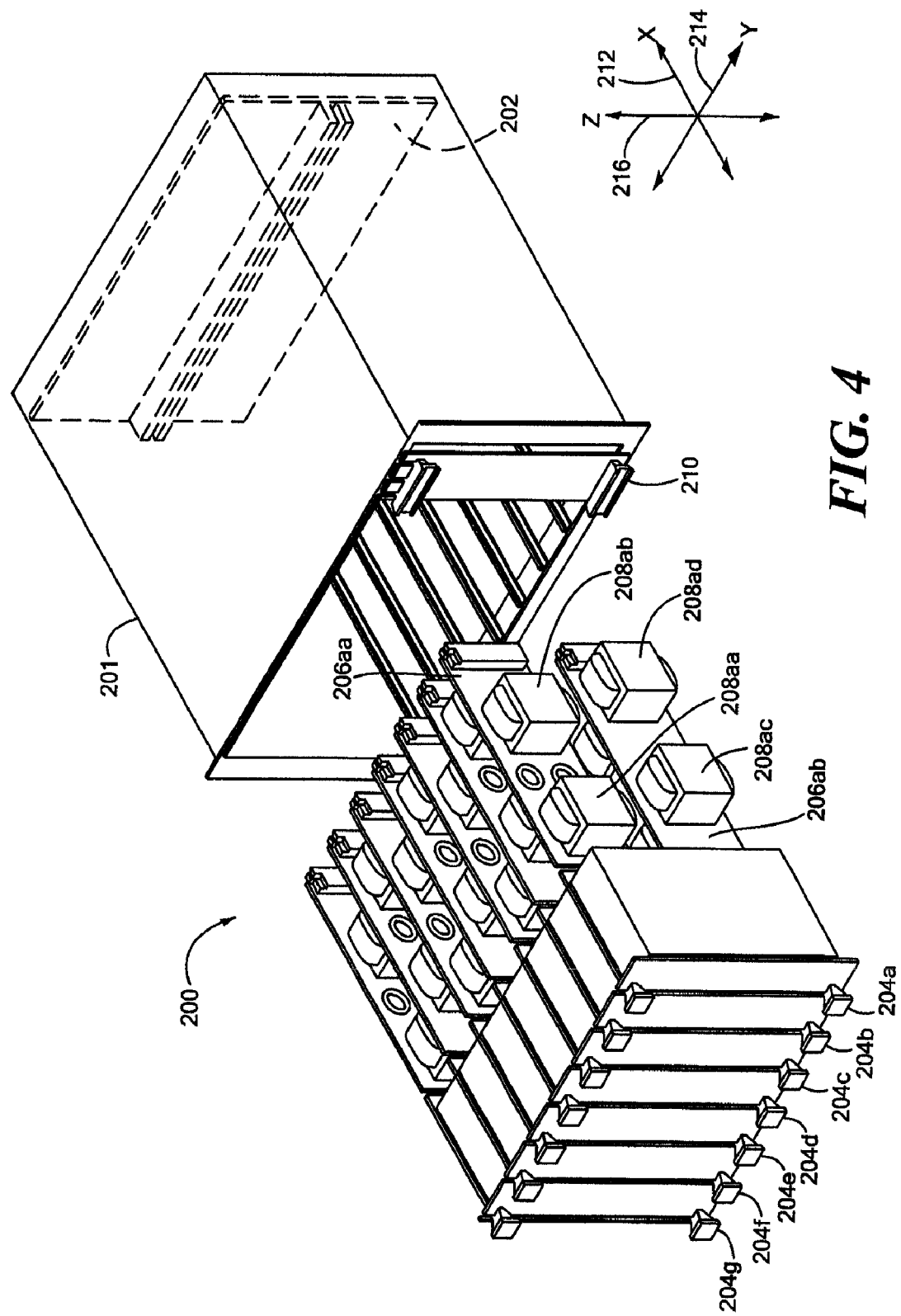
FIG. 4 is an exploded block diagram showing further details of a transceiver module sub-rack shown in FIG. 2.

Referring now to FIG. 4, a transceiver module sub-rack 200 can be the same as or similar to one of the transceiver module sub-racks 74a-74c of FIG. 2, which are included within the transceiver module rack 56 of FIG. 1. The transceiver module sub-rack 200 includes a housing 201, at least one backplane 202, and seven four channel transceiver modules 204a-204g. Each one of the seven four channel receiver modules 204a-204g includes a respective set of four magnetic elements. Taking the transceiver module 204a to be representative of others of the transceiver modules 204b-204g, the transceiver module 204a includes a first magnetic sub-assembly 206aa having at least two magnetic elements 208aa, 208ab and a second magnetic sub-assembly 206ab having another at least two magnetic elements 208ac, 208ad. The transceiver module sub-rack 200 also includes a fiber optic telemetry interface 210.

The group of transceiver modules 204a-204g can be the same as or similar to the group of transceiver modules 76a-76g of FIG. 2, and each one of the transceiver modules can be the same as or similar to the transceiver module 100 of FIG. 3. The fiber optic telemetry interface 210 can be the same as or similar to one of the fiber optic telemetry interfaces 80a-80c of FIG. 2.

The magnetic elements 208aa-208ad are shown to be transformers. However, in other embodiments, the magnetic elements 208aa-208ad can be inductors or any combination of inductors, transformers, resistors, and capacitors. It will be generally understood that the magnetic elements 208aa-208ad are selected to tune to at least one resonance of an acoustic element to which they couple. It will also be generally understood that signals appearing in the magnetic elements 208aa-208ad tend to have a relatively high voltage, a relatively high current, or both.

It is undesirable for signals appearing in the magnetic elements 208aa-208ad to crosstalk into each other, into other ones of the magnetic elements, or into other circuitry of any of the transceiver modules 204a-204g. To reduce crosstalk, the sub-assembly 206aa can be offset along a y-axis 214 with respect to the sub-assembly 206ab. In other arrangements, the magnetic element 208ab can be disposed in a position rotated about the y-axis 214 relative to the magnetic element 208aa and the magnetic element 208ad can be disposed in a position rotated about the y-axis 214 relative to the magnetic element 208ac The backplane 202 can distribute low voltage power and high voltage power to the transceiver modules 204a-204g which originates from power supplies in a rack (e.g., 72, FIG. 2) in which the transceiver module sub-rack 200 is disposed. The power supplies can be the same as or similar to the low voltage power supply 86 and the high voltage power supply 88 of FIG. 2

In one particular arrangement, the transceiver module sub-rack 200 and transceiver modules 204a-204g have sizes and dimensions in accordance with Versa Module Europa (VME) standards.

While arrangements are shown and described above for which a transceiver module, e.g., the transceiver module 100 of FIG. 3, is disposed within a rack, e.g., the transceiver module rack 56 of FIG. 1, in other arrangements, the transceiver module 100 in disposed within a sonar array, e.g., the sonar arrays 62, 63 of FIG. 1. In these embodiments, the transceiver module can have more than four or fewer than four transmitters and receiver. With this arrangement, cables 58a-58M of FIG. 1 can be eliminated, saving cost and space.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A sonar system, comprising:
    a plurality of transceiver modules arranged on separate circuit boards and coupled to receive a common transmit/receive control signal, wherein selected ones of the plurality of transceiver modules are configured to transmit respective pluralities of transmit signals to respective pluralities of transmit acoustic elements of a transmit sonar array in accordance with the common transmit/receive control signal, and wherein the selected ones of the plurality of transceiver modules are configured to receive respective pluralities of receive signals from respective pluralities of receive acoustic elements of a receive sonar array in accordance with the common transmit/receive control signal, wherein the common transmit/receive control signal includes a transmit control signal and a receive control signal, and wherein the common transmit/receive control signal includes synchronization information configured to time synchronize the selected ones of the plurality of transceiver modules with each other to contribute to an electronically steered transmit acoustic beampattern;
    a telemetry interface; and
    a telemetry medium having a first end coupled to the telemetry interface and having a second end coupled to the transceiver module to communicate the common transmit/receive control signal to the plurality of transceiver modules.

2. The sonar system of claim 1, wherein the transmit and receive sonar arrays are the same sonar array.

3. The sonar system of claim 1, wherein the transmit and receive acoustic elements are the same acoustic elements.

4. The sonar system of claim 1, wherein the telemetry interface includes a fiber optic telemetry interface and the telemetry medium includes a fiber optic telemetry medium.

5. The sonar system of claim 1, wherein the telemetry interface includes a wireless telemetry interface and the telemetry medium includes a wireless telemetry medium.

6. The sonar system of claim 1, wherein each one of the selected ones of the plurality of transceiver modules comprises:
    a respective plurality of transmitters configured to couple to a respective one of the pluralities of transmit acoustic elements of the transmit sonar array;
    a respective plurality of receivers configured to couple to a respective one of the pluralities of receive acoustic elements of the receive sonar array, and wherein the common transmit/receive control signal includes synchronization information configured to time synchronize the plurality of transmitters with each other to contribute to the electronically steered transmit acoustic beampattern and configured to time synchronize the plurality of receivers with each other to contribute to an electronically steered receive acoustic beampattern, and
    an input/output processor coupled to the selected ones of the plurality of transceiver modules and to the telemetry interface, wherein the input/output processor is coupled to receive the common transmit/receive control signal from the telemetry interface, wherein the plurality of transmitters is coupled to receive the transmit control signal in accordance with the common transmit/receive control signal, wherein the plurality of receivers is coupled to receive the receive control signal in accordance with the common transmit/receive control signal, and wherein the plurality of receivers is further configured to transmit time samples representative of an acoustic signal received by the plurality of receive acoustic elements via the input/output processor and via the telemetry medium.

7. The sonar system of claim 6, wherein the plurality of transmitters and the plurality of receivers are disposed on a common circuit board assembly.

8. The sonar system of claim 6, wherein each one of the plurality of transmitters comprises:
    a respective waveform memory having an input node and an output node, wherein the waveform memory is coupled to receive a characteristic of a transmit signal at the input node, configured to store the characteristic, and configured to provide the characteristic at the output node in response to the common transmit/receive control signal; and
    a respective waveform synthesizer coupled to the respective waveform memory and having an input node and an output node, wherein the waveform synthesizer is coupled to receive the characteristic of the transmit signal at the input node and to synthesize and generate a signal representative of the transmit signal at the output node in accordance with the characteristic received at the input node in response to the common transmit/receive control signal.

9. The sonar system of claim 8, wherein each one of the plurality of transmitters comprises:
    a respective delay processor coupled to the waveform synthesizer and having an input node and an output node, wherein the delay processor is coupled to receive a signal representative of the transmit signal at the input node and to generate a time-delayed version of the signal representative of the transmit signal at the output node in response to the common transmit/receive control signal;
    a respective amplitude scaling processor coupled to the delay processor and having an input node and an output node, wherein the amplitude scaling processor is coupled to receive the time-delayed version of the signal representative of the transmit signal at the input node and to generate an amplitude sealed version of the signal representative of the transmit signal at the output node in response to the common transmit/receive control signal; and
    a respective timing reference configured to influence a timing of the signal representative of the transmit signal in response to the common transmit/receive control signal.

10. The sonar system of claim 6, wherein each one of the plurality of receivers comprises:
    a respective data formatting processor having an input node and an output node, wherein the data formatting processor is coupled to receive data representative of a receive signal at the input node, to convert the data to a selected data format, and to provide the data having the selected data format at the output node in response to the common transmit/receive control signal, a respective time slot assignment processor coupled to the data formatting processor and having an input node and an output node, wherein the time slot processor is coupled to receive the data having the selected data format at the input node and to provide the data in a selected time slot in response to the common transmit/receive control signal; and a respective timing reference configured to synchronize a characteristic of a respective receiver in response to the common transmit/receive control signal.

11. The sonar system of claim 10, wherein the characteristic of the receiver is at least one of a gain of the receiver or the selected time slot of the data.

12. The sonar system of claim 6, further comprising:

a processor coupled to the telemetry interface and coupled to receive the time samples representative of the acoustic signal received by the plurality of receive acoustic elements, wherein the processor includes a beamformer configured to steer receive beams associated with the receive sonar array in multi-dimensional space in accordance with the time samples.

13. The sonar system of claim 6, further comprising:

a processor coupled to the telemetry interface and configured to generate the common transmit/receive control signal.

14. The sonar system of claim 6, wherein the each one of the plurality of transceiver modules further comprises a respective plurality of calibration memories, each configured to hold at least one of receive calibration values associated with a gain of a respective one of the plurality of receivers or transmit calibration values associated with a magnitude of an output signal from a respective one of the plurality of transmitters.

15. A sonar transceiver module, comprising:

a plurality of transmitters configured to couple to a respective plurality of transmit acoustic elements of a transmit sonar array;

a plurality of receivers configured to couple to a respective plurality of receive acoustic elements of a receive sonar array, wherein the common transmit/receive control signal includes synchronization information configured to time synchronize the plurality of transmitters with each other to contribute to an electronically steered transmit acoustic beampattern and configured to time synchronize the plurality of receivers with each other to contribute to an electronically steered receive acoustic beampattern; and an input/output processor coupled to the plurality of transmitters and to the plurality of receivers, wherein the input/output processor is coupled to receive a common transmit/receive control signal including a transmit control signal and a receive control signal, wherein the plurality of transmitters is coupled to receive the transmit control signal in accordance with the common transmit/receive control signal, wherein the plurality of receivers is coupled to receive the receive control signal in accordance with the common transmit/receive control signal, and wherein the plurality of receivers is further configured to transmit time samples representative of an acoustic signal received by the plurality of receive acoustic elements via the input/output processor.

16. The sonar transceiver module of claim 15, wherein the transmit and receive sonar arrays are the same sonar array.

17. The sonar transceiver module of claim 15, wherein the plurality of transmit acoustic elements and plurality of receive acoustic elements are the same acoustic elements.

18. The sonar transceiver module of claim 15, wherein the common transmit/control signal includes a characteristic of a transmit waveform.

19. The sonar transceiver module of claim 18, wherein the characteristic of the transmit waveform includes a modulation characteristic of the transmit waveform.

20. The sonar transceiver module of claim 15, wherein the plurality of transmitters and the plurality of receivers are disposed on a common circuit board assembly.

21. The sonar transceiver module of claim 15, wherein each one of the plurality of transmitters comprises:

a respective waveform memory having an input node and an output node, wherein the waveform memory is coupled to receive a characteristic of a transmit signal at the input node, configured to store the characteristic, and configured to provide the characteristic at the output node in response to the common transmit/receive control signal; and a respective waveform synthesizer coupled to the respective waveform memory and having an input node and an output node, wherein the waveform synthesizer is coupled to receive the characteristic of the transmit signal at the input node and to synthesize and generate a signal representative of the transmit signal at the output node in accordance with the characteristic received at the input node in response to the common transmit/receive control signal.

22. The sonar transceiver module of claim 15, wherein each one of the plurality of transmitters comprises:

a respective delay processor coupled to the waveform synthesizer and having an input node and an output node, wherein the delay processor is coupled to receive a signal representative of the transmit signal at the input node and to generate a time-delayed version of the signal representative of the transmit signal at the output node in response to the common transmit/receive control signal;

a respective amplitude scaling processor coupled to the delay processor and having an input node and an output node, wherein the amplitude scaling processor is coupled to receive the time-delayed version of the signal representative of the transmit signal at the input node and to generate an amplitude scaled version of the signal representative of the transmit signal at the output node in response to the common transmit/receive control signal; and a respective timing reference configured to influence a timing of the transmit signal in response to the common transmit/receive control signal.

23. The sonar transceiver module of claim 15, wherein each one of the plurality of receivers comprises:

a respective data formatting processor having an input node and an output node, wherein the data formatting processor is coupled to receive data representative of a receive signal at the input node, to convert the data to a selected data format, and to provide the data having the selected data format at the output node in response to the common transmit/receive control signal, a respective time slot assignment processor coupled to the data formatting processor and having an input node and an output node, wherein the time slot processor is coupled to receive the data having the selected format at the input node and to provide the data in a selected time slot in response to the common transmit/receive control signal; and a respective timing reference configured to synchronize a characteristic of a respective receiver in response to the common transmit/receive control signal.

24. The sonar transceiver module of claim 23, wherein the characteristic of the receiver is at least one of again of the receiver or the selected time slot of the data.

25. The sonar transceiver module of claim 15, wherein each one of the plurality of transmitters includes at least one of a respective transformer or a respective inductor configured to tune with a respective one or more of the plurality of transmit acoustic elements.

26. The sonar transceiver module of claim 15, wherein the each one of the plurality of transmitters includes at least two respective transformers disposed at relative positions and a relative orientation to reduce crosstalk between the at least two transformers.

27. The sonar transceiver module of claim 15, wherein each one of the plurality of receivers includes a respective test target data generator configured to generate a digital test signal representative of a target in water in response to the common transmit/receive control signal.

28. The sonar transceiver module of claim 15, wherein each one of the plurality of receivers includes a respective test signal generator configured to generate an analog test signal in response to the common transmit/receive control signal.

29. The sonar transceiver module of claim 15, wherein the transceiver module further comprises a plurality of calibration memories, each configured to hold at least one of receive calibration values associated with a gain of a respective one of the plurality of receivers or transmit calibration values associated with a magnitude of an output signal from a respective one of the plurality of receivers.

30. A method of transmitting and receiving in a sonar system, comprising:
receiving a common transmit/receive control signal including a transmit control signal and a receive control signal, wherein the common transmit/receive control signal includes time synchronization information;
generating a plurality of transmit signals in accordance with the common transmit/receive control signal and in accordance with the time synchronization information;
transmitting the plurality of transmit signals to a respective plurality of transmit acoustic elements of a transmit sonar array to generate a plurality of electronically steered transmit acoustic beams;
receiving a plurality of receive signals from a respective plurality of receive acoustic elements of a receive sonar array in accordance with the common transmit/receive control signal;
converting the plurality of receive signals to a respective plurality of digital receive signals; and
transmitting the plurality of digital receive signals.

31. The method of claim 30, wherein the transmit and receive sonar arrays are the same sonar array.

32. The method of claim 30, wherein the plurality of transmit acoustic elements and the plurality of receive acoustic elements are the same acoustic elements.

33. The method of claim 30, wherein the common transmit/receive control signal includes a respective plurality of characteristics of the plurality of a transmit signals, and wherein generating the plurality of transmit signals comprises:
storing the plurality of characteristics of the plurality of transmit signals;
recalling the stored plurality of characteristics of the plurality of transmit signals; and
synthesizing the plurality of transmit signals in accordance with the plurality of characteristics.

34. The method of claim 30, wherein the generating the plurality of transmit signals comprises time delaying selected ones of the plurality of transmit signals in response to the common transmit/receive control signal.

35. The method of claim 30, wherein the plurality of transmit signals comprises amplitude scaling selected ones of the plurality of transmit signals in response to the common transmit/receive control signal.

36. The method of claim 30, wherein the generating the plurality of transmit signals comprises:
generating transmit calibration values; and
amplitude scaling selected ones of the plurality of transmit signals in accordance with the transmit calibration values.

37. The method of claim 30, wherein the receiving the plurality of receive signals comprises:
generating receive calibration values; and
gain adjusting selected ones of the plurality of receive signals in accordance with the receive calibration values.

38. The sonar system of claim 1, wherein the common transmit/receive control signal comprises transmit waveform values, including at least one of digital values representative of a lowest frequency, a highest frequency, and a sweep rate associated with a chirp transmit signal or a lowest and highest band frequency associated with a broadband transmit signal.

39. The sonar system of claim 1, wherein some of the pluralities of transmit signals are communicated to a first sonar array providing a first sonar function and others of the pluralities of transmit signals are communicated to a second sonar array providing a second sonar function.

40. The sonar transceiver module of claim 15, wherein the common transmit/receive control signal comprises transmit waveform values, including at least one of digital values representative of a lowest frequency, a highest frequency, and a sweep rate associated with a chirp transmit signal or a lowest and highest band frequency associated with a broadband transmit signal.

41. The sonar transceiver module of claim 15, wherein some of the plurality of transmitters are coupled to a first sonar array providing a first sonar function and others of the plurality of transmitters are coupled to a second sonar array providing a second sonar function.

42. The method of claim 30, wherein the common transmit/receive control signal comprises transmit waveform values, including at least one of digital values representative of a lowest frequency, a highest frequency, and a sweep rate associated with a chirp transmit signal or a lowest and highest band frequency associated with a broadband transmit signal.

43. The method of claim 30, wherein some of the plurality of transmit signals are communicated to a first sonar array providing a first sonar function and others of the plurality of transmit signals are communicated to a second sonar array providing a second sonar function.

* * * * *

UNITED STATES PATENT AND TRADEMARK OFFICE
CERTIFICATE OF CORRECTION

PATENT NO. : 7,512,037 B2
APPLICATION NO. : 11/383060
DATED : March 31, 2009
INVENTOR(S) : Frodyma et al.

It is certified that error appears in the above-identified patent and that said Letters Patent is hereby corrected as shown below:

Column 1, line 53-54, delete "three dimensional" and replace with --three-dimensional--.

Column 2, line 28, delete "provide" and replace with --provides--.

Column 4, line 38, delete "in" and replace with --is--.

Column 6, line 27-28, delete "three dimensional" and replace with --three-dimensional--.

Column 7, line 17-18, delete "used the" and replace with --used for the--.

Column 8, line 41, delete "tranrsceiver" and replace with --transceiver--.

Column 10, line 41, delete ", fore" and replace with --, for--.

Column 12, line 3, delete "function" and replace with --functions--.

Column 12, line 40, delete "converters" and replace with --converter--.

Column 13, line 6, delete "clement" and replace with --element--.

Column 14, line 57, delete ", FIG. 1))," and replace with --, FIG 1),--.

Column 15, line 37, delete "arrangement," and replace with --arrangements,--.

Column 15, line 52, delete "degrees" and replace with --degrees.--.

Column 17, line 6, delete "receiver." and replace with --receivers.--.

Column 18, line 53, delete "sealed" and replace with --scaled--.

Column 21, line 5, delete "again" and replace with --a gain--.

Column 21, line 60, delete "of a transmit signals," and replace with --of transmit signals,--.

UNITED STATES PATENT AND TRADEMARK OFFICE
CERTIFICATE OF CORRECTION

PATENT NO. : 7,512,037 B2
APPLICATION NO. : 11/383060
DATED : March 31, 2009
INVENTOR(S) : Frodyma et al.

It is certified that error appears in the above-identified patent and that said Letters Patent is hereby corrected as shown below:

Column 22, line 11, delete "wherein the plurality" and replace with --wherein the generating the pluratiy--.

Signed and Sealed this

Eleventh Day of August, 2009

David J. Kappos
*Director of the United States Patent and Trademark Office*